United States Patent
Kimpel

(10) Patent No.: US 7,510,013 B2
(45) Date of Patent: Mar. 31, 2009

(54) HYDRAULIC METERING VALVE FOR OPERATION OF DOWNHOLE TOOLS

(75) Inventor: Robert P. Kimpel, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 200 days.

(21) Appl. No.: 11/479,132

(22) Filed: Jun. 30, 2006

(65) Prior Publication Data

US 2008/0000643 A1 Jan. 3, 2008

(51) Int. Cl.
*E21B 34/06* (2006.01)

(52) U.S. Cl. .............. 166/373; 166/374; 166/375; 166/320; 166/324; 251/57

(58) Field of Classification Search ........... 166/373, 166/374, 375, 320, 324; 417/383, 385, 555.1; 251/57

See application file for complete search history.

(56) References Cited

U.S. PATENT DOCUMENTS

| | | | | | |
|---|---|---|---|---|---|
| 4,003,679 | A | * | 1/1977 | McManigill | 417/246 |
| 4,314,797 | A | * | 2/1982 | Gerwin | 417/491 |
| 4,540,348 | A | * | 9/1985 | Soderberg | 417/383 |
| 4,580,952 | A | * | 4/1986 | Eberle | 417/383 |
| 5,307,872 | A | * | 5/1994 | Noyes | 166/54 |
| 5,564,501 | A | | 10/1996 | Strattan et al. | 166/375 |
| 5,906,220 | A | * | 5/1999 | Thompson | 137/492.5 |
| 6,082,629 | A | * | 7/2000 | Lee et al. | 239/106 |
| 6,427,778 | B1 | * | 8/2002 | Beall et al. | 166/321 |
| 6,513,594 | B1 | * | 2/2003 | McCalvin et al. | 166/320 |
| 6,585,051 | B2 | * | 7/2003 | Purkis et al. | 166/374 |
| 7,118,352 | B2 | * | 10/2006 | Gruett et al. | 417/225 |
| 7,124,819 | B2 | * | 10/2006 | Ciglenec et al. | 166/264 |
| 7,237,472 | B2 | * | 7/2007 | Cove | 91/437 |
| 2001/0037884 | A1 | * | 11/2001 | Schultz et al. | 166/378 |
| 2002/0050354 | A1 | * | 5/2002 | Schultz et al. | 166/250.01 |
| 2004/0069491 | A1 | * | 4/2004 | Garay et al. | 166/320 |
| 2006/0278395 | A1 | * | 12/2006 | Kenison et al. | 166/312 |

FOREIGN PATENT DOCUMENTS

WO WO 01/83939 A1 11/2001

* cited by examiner

*Primary Examiner*—David J Bagnell
*Assistant Examiner*—Cathleen R Hutchins
(74) *Attorney, Agent, or Firm*—Shawn Hunter

(57) ABSTRACT

Methods and systems for operating a sliding sleeve valve or other downhole well tool that is axially shiftable among a finite number of increments between two extreme configurations such as open and closed configurations. A metering device is described having a pair of piston metering assemblies that operate in parallel fluid flow paths. The first piston metering assembly moves the sleeve of the well tool from a fully closed position to the zero position. The second piston metering assembly can be repeatedly pressurized and depressurized to meter predetermined amounts of fluid from an actuator sequentially to move the sleeve of the sleeve valve in consecutive increments toward a fully open position.

16 Claims, 5 Drawing Sheets

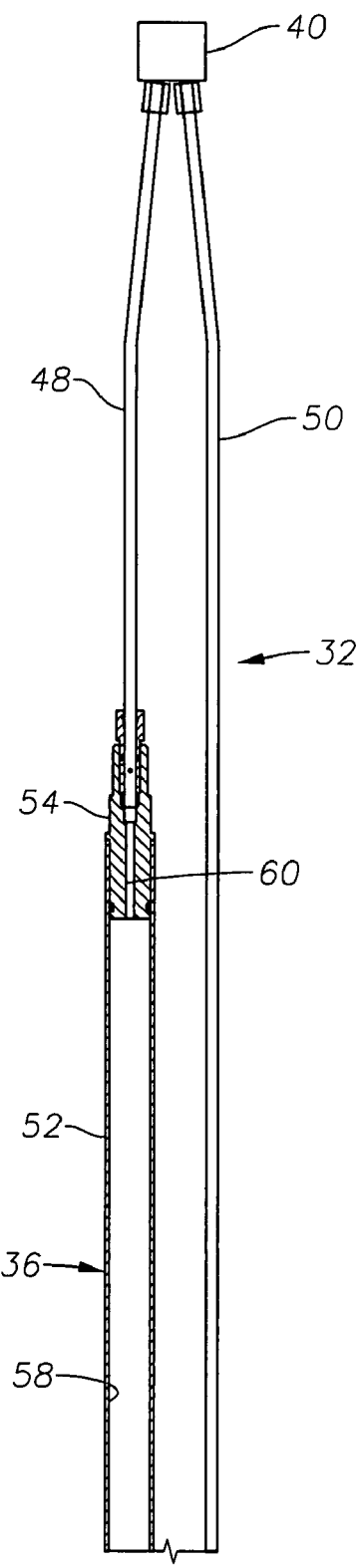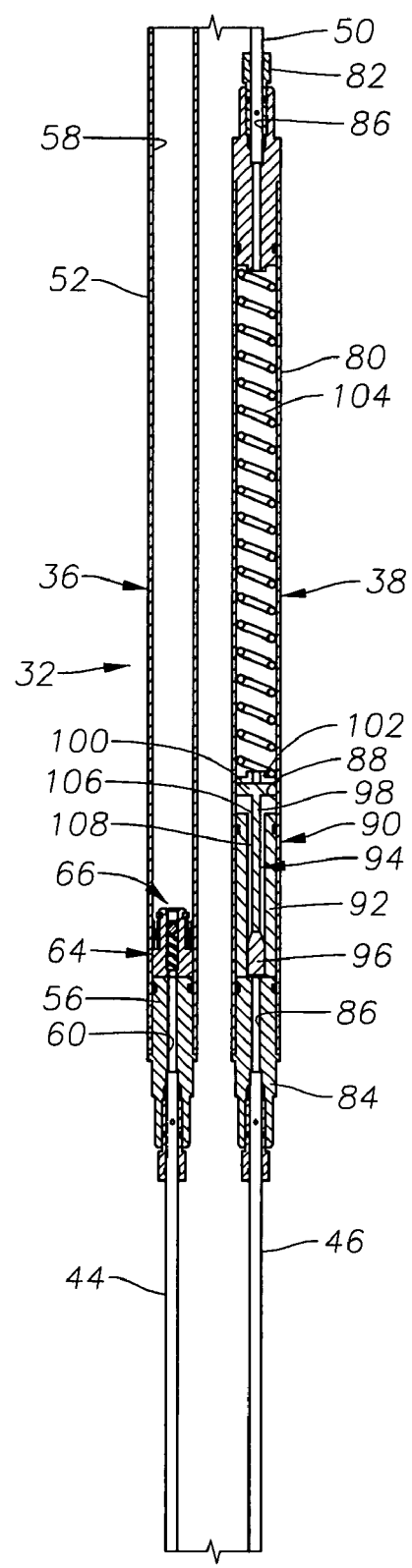
Fig. 5A
Fig. 5B

HYDRAULIC METERING VALVE FOR OPERATION OF DOWNHOLE TOOLS

BACKGROUND OF THE INVENTION

1. Field of the Invention

The invention relates generally to hydraulic metering devices used to operate downhole devices, such as sliding sleeve valves.

2. Description of the Related Art

A number of downhole devices are operated hydraulically. At times, it is desirable to operate these devices in a stepped manner to respond to changes in downhole conditions. For example, a production tubing string might have a sliding sleeve valve associated with a production nipple to control the flow of fluid into the production tubing string. It would be desirable to be able to shift the sliding sleeve by increments between an open and a closed position. This adjustability would allow fluid flow into the tubing string through the production nipple to be balanced with fluid flowing into the tubing string from other production nipples.

Attempts have been made to use metering devices to adjustably operate a downhole device in a stepped manner. Unfortunately, most of these arrangements have proven to be complex in construction and operation. For example, PCT Application No. PCT/US00/12329 by Schultz et al., entitled "Hydraulic Control System for Downhole Tools" describes a hydraulic control system for multiple well tool assemblies that includes a metering device. The metering device uses two pumps. One of the pumps transfers fluid from a first hydraulic line to an actuator of the well tool assembly in response to fluctuations in pressure on a second hydraulic line, and the other pump transfers fluid from the second hydraulic line to the actuator in response to fluctuations in pressure on the first hydraulic line. The fact that this system requires multiple pumps with associated hydraulic lines makes the system complex in practice and costly.

U.S. Pat. No. 6,585,051 issued to Purkis describes a number of metering apparatuses for use in a downhole environment to discharge a known volume of fluid into a well tool actuator. These metering devices are relatively complex and, therefore, may be prone to failure during use. Additionally, several of the described metering devices incorporate numerous elastomeric O-rings to create fluid tight seals within the metering devices. The O-rings are prone to wear and failure during operation, making metering of a known volume unreliable.

Additionally, the prior art metering arrangements all meter fluid into a fluid input on the downhole device. This can be problematic in some instances The present invention addresses the problems of the prior art.

SUMMARY OF THE INVENTION

The invention provides devices and methods for operating a sliding sleeve valve or other downhole well tool that is axially shiftable among a finite number of increments between two extreme configurations such as open and closed configurations. A metering device is described having a pair of piston metering assemblies that operate in parallel fluid flow paths. The first piston metering assembly is a "zero position" piston assembly, which when actuated, moves the sleeve of the well tool from a fully closed position to the zero position. The second piston metering assembly is an incremental piston assembly, which can be repeatedly pressurized and depressurized to meter predetermined amounts of fluid from an actuator sequentially to move the sleeve of the sleeve valve in consecutive increments toward a fully open position. The sleeve valve may be moved back to a fully closed position by reverse pressurizing the metering device.

In other aspects, the invention relates to methods of operating a downhole tool, such as a sliding sleeve valve, using a hydraulic metering device so that the tool is adjusted in increments between two extreme configurations, such as open and closed positions. In practice, the metering device and methods of the present invention are less complex than prior art metering arrangements, and the nature of the components used makes the metering device less prone to wear-induced problems, such as the deterioration of elastomeric O-ring seals.

A further advantage of the metering assembly of the present invention is that the metering assembly can be operably interconnected to either the "open" line (fluid inlet) or "close" line (fluid outlet) of a well tool actuator in order to operate the well tool. In a currently preferred embodiment, the metering assembly is connected to the fluid output of the well tool actuator to meter fluid out of the actuator in incremental known amounts to cause the well tool to be actuated in a stepped, incremental manner.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designate like or similar elements throughout the several figures of the drawings and wherein:

FIGS. 5A-5B present a side, cross-sectional view of portions of the exemplary hydraulic metering valve, in an unpressurized condition as used in the well tool system shown in FIGS. 1-3, constructed in accordance with the present invention.

DETAILED DESCRIPTION OF THE PREFERRED EMBODIMENTS

Figure 1:
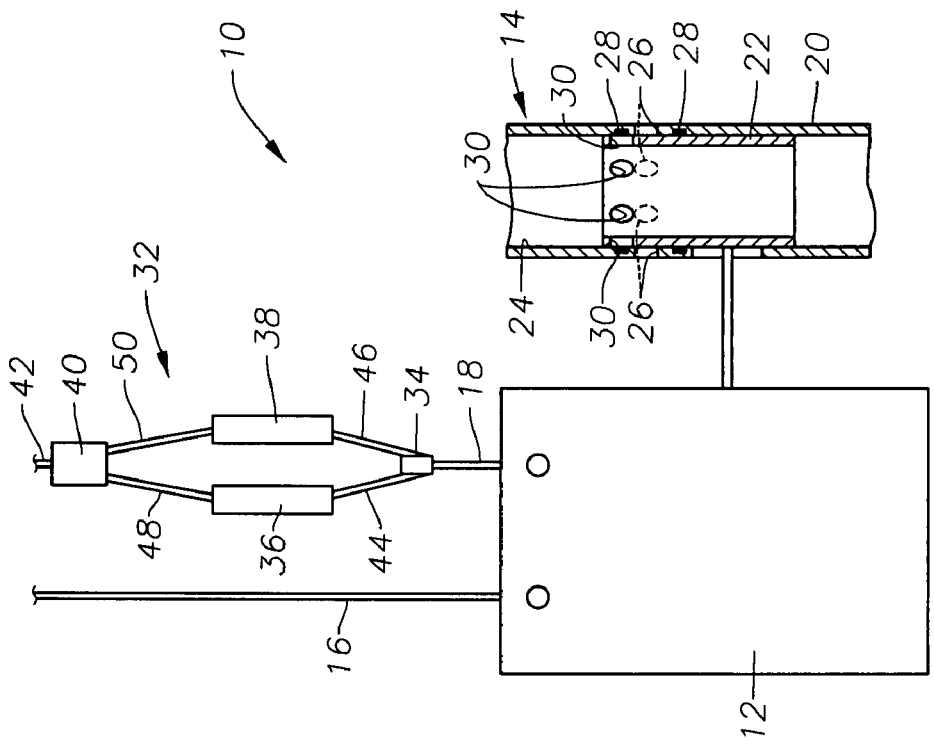
FIG. 1 is a schematic view of a downhole well tool system having a fully closed sliding sleeve valve associated with a hydraulic metering valve in accordance with the present invention.

FIGS. 1-4 depict a well tool system 10 that includes a well tool actuator 12 and associated well tool 14. The well tool 14 is of a variety that is operable in a stepped manner between two extreme positions or configurations. It is noted that the components of the system 10 are shown schematically and, in practice, would be integrated into one or more housings or subs (not shown) in a wellbore production tubing string or similar well tool. One example of a suitable well tool actuator 12 is the "HCM-A" sliding sleeve valve hydraulic actuator that is available commercially from Baker Oil Tools of Houston, Tex. The actuator 12 is provided with a hydraulic "open" line 16 and a hydraulic "close" line 18. As will be described in detail shortly, fluid pressure is increased within the hydraulic "open" line 16 in order to move the well tool 14 toward an open configuration, and fluid pressure is increased within the "close" line 18 in order to move the well tool 14 toward a closed configuration.

In currently preferred embodiments, and as depicted in FIGS. 1-4, the well tool 14 comprises a sliding sleeve valve, of a type known in the art. In this embodiment, the sliding sleeve valve includes a generally cylindrical housing 20 and a tubular sleeve 22 that is shiftable with respect to the housing 20. Alignable fluid flow ports control fluid flow between the radial exterior of the housing 20 of the sleeve valve 14 and the interior flowbore 24 of the housing 20. The housing 20 contains fluid flow ports 26 with interior fluid seals 28 located on each axial side thereof. The sleeve 22 has lateral ports 30 disposed therethrough. In a fully closed position, shown in FIG. 1, the ports 30 of the sleeve 22 are not aligned with the ports 26 of the housing 20, and fluid flow between the radial exterior of the housing 20 and the flowbore 24 is blocked by fluid seals 28. In a fully opened position (FIG. 4), the ports 30 of the sleeve 22 are fully aligned with the ports 26 of the housing 20, allowing maximum fluid flow through the sleeve valve 14. In instances wherein the sleeve valve 14 functions as a fluid flow choke within a production tubing string, it would be desirable to be able to move the sleeve 22 in a stepped manner between intermediate positions that lie between the fully opened and fully closed positions. This would allow the amount of fluid flow to be adjusted in response to changing well conditions, such as an increase in the amount of water content within the production fluid obtained from the surrounding formation and the need to balance the production obtained from one formation with that obtained from other formations.

A hydraulic metering device, generally indicated at 32, is associated with the close line, or fluid output, 18 of the sleeve valve actuator 12. Still referring to FIGS. 1-4, the metering device 32 generally includes an upstream filter 34, a pair of piston metering assemblies 36, 38, and a downstream filter 40. The downstream filter 40 is operably interconnected with a further hydraulic control line 42 that extends to the surface of the wellbore (not shown). Hydraulic fluid conduit 44 interconnects the upstream filter 34 with the first piston metering assembly 36, and hydraulic fluid conduit 46 interconnects the upstream filter 34 with the second piston metering assembly 38. Additionally, a hydraulic fluid conduit 48 interconnects the first piston metering assembly 36 with the downstream filter 40, while fluid conduit 50 interconnects the second piston metering assembly 36 with the downstream filter 40. It is noted that the upstream and downstream filters 34, 40 serve as fluid filters to help remove debris from the hydraulic fluid within the system and also serve to split the flow of fluid into parallel flow paths. Fluid exiting the actuator 12 via the fluid outlet 18 will be split by the upstream filter 34 so that the fluid will pass into both the first piston metering assembly 36 and the second piston metering assembly 38. Conversely, fluid flowed in the reverse direction, through the control line 42, the downstream filter 40 will split the flow of fluid into parallel flow paths that will pass through both the first piston metering assembly 36 and the second fluid metering assembly 38. Thus, there are parallel flow paths through the metering device 32.

Portions of the hydraulic metering device 32 are more clearly depicted in FIGS. 5A-5B and 6A-6B. The first piston metering assembly 36 is referred to as a "zero position" piston assembly and includes a tubular piston housing 52 with upper and lower end subs 54, 56, respectively, at opposite axial ends thereof. A piston chamber 58 is defined within the housing 52 and end subs 54, 56. Each of the end subs 54, 56 contains an axial fluid flow passage 60 defined therein to allow fluid to enter or exit the piston chamber 58. Thus, end sub 54 serves as a fluid outlet to the piston chamber 58 while end sub 56 provides a fluid inlet. The piston chamber 58 retains a "zero position" free piston 64 that is slidably moveable within the chamber 58. The free piston 64 contains a spring-biased check valve 66 that permits one-way flow of fluid across the free piston 64. Details of the construction of the free piston 64 and check valve 66 are more readily apparent with reference to FIG. 7. As depicted there, the check valve 66 is housed within a fluid passage 67 in the body 68 of the free piston 64, and includes a valve ball member 70 that is biased against valve seat 72 by compressible spring 74. It is noted that annular fluid seals 76 surround the body 68 of the free piston 64 to create a fluid seal against the housing 52.

The second piston metering assembly 38 is referred to as an incremental piston assembly and includes a tubular piston housing 80 with upper and lower end subs 82, 84 secured at opposite axial ends. Fluid passages 86 are disposed axially through each of the end subs 82, 84. An incremental piston chamber 88 is defined within the piston housing 80 between the end subs 82, 84. End sub 84 provides a fluid inlet for the chamber 88 while end sub 82 provides a fluid outlet. The piston chamber 88 contains an incremental piston pump, generally shown at 90. The incremental piston pump 90 is useful for sequentially displacing a predetermined, known amount of fluid through the piston chamber 88 of the incremental piston assembly 38 and includes a piston sleeve 92 which radially surrounds a piston member 94. The piston member 94 features an enlarged pressure-receiving end 96, a reduced diameter shaft portion 98 and an enlarged piston head 100. The piston member 94 is moveable with respect to the sleeve 92 between a retracted position (FIG. 5B) and an extended position (FIG. 6B). When moved to the extended position, the enlarged piston head 100 displaces a volume of fluid through the fluid outlet of end sub 82 and substantially the same volume of fluid is drawn into the fluid inlet of end sub 84 from the actuator 12. The enlarged piston head 100 of the piston member 94 contacts an end portion 102 of compression spring member 104, which is disposed within the chamber 88. The spring 104 biases the piston member 94 toward the retracted position. Although the spring 104 illustrated in the drawings is a spiral-type spring, those of skill in the art will recognize that other compressible spring designs could just as easily be used, including, for example, stacks of Belleville washers or fluid springs, as are known in the art. When fluid pressure is increased within the hydraulic fluid conduit 46, it bears upon pressure-receiving end portion 96 to urge the piston member 94 to move axially with respect to the sleeve 92 toward the extended position, and the spring member 104 is compressed by the piston head 100 (see FIG. 6B). It is noted that, while the pressure-receiving end 96 of the piston member 94 may be disposed within the surrounding sleeve 92 with a relatively close fit, there are no elastomeric or other fluid-tight seals located between the piston member 94 and sleeve 92. As a result, it is contemplated that some fluid pressure will seep between the piston member 94 and sleeve 92 during operation.

Figure 2:
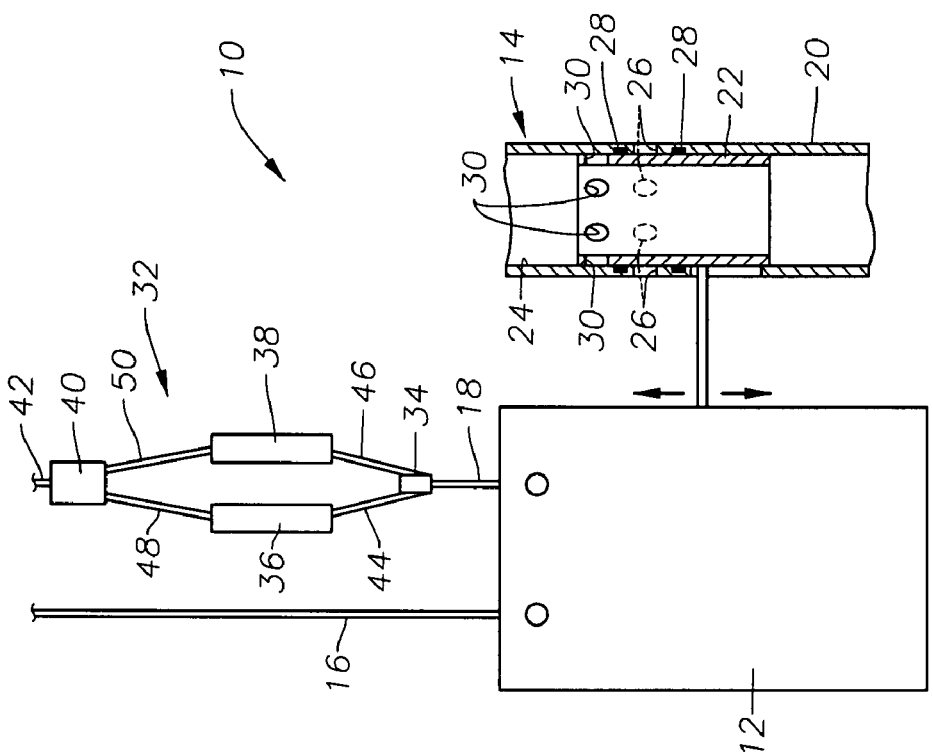
FIG. 2 is a schematic view of the arrangement shown in FIG. 1, now with the sliding sleeve valve in the zero position.
Figure 3:
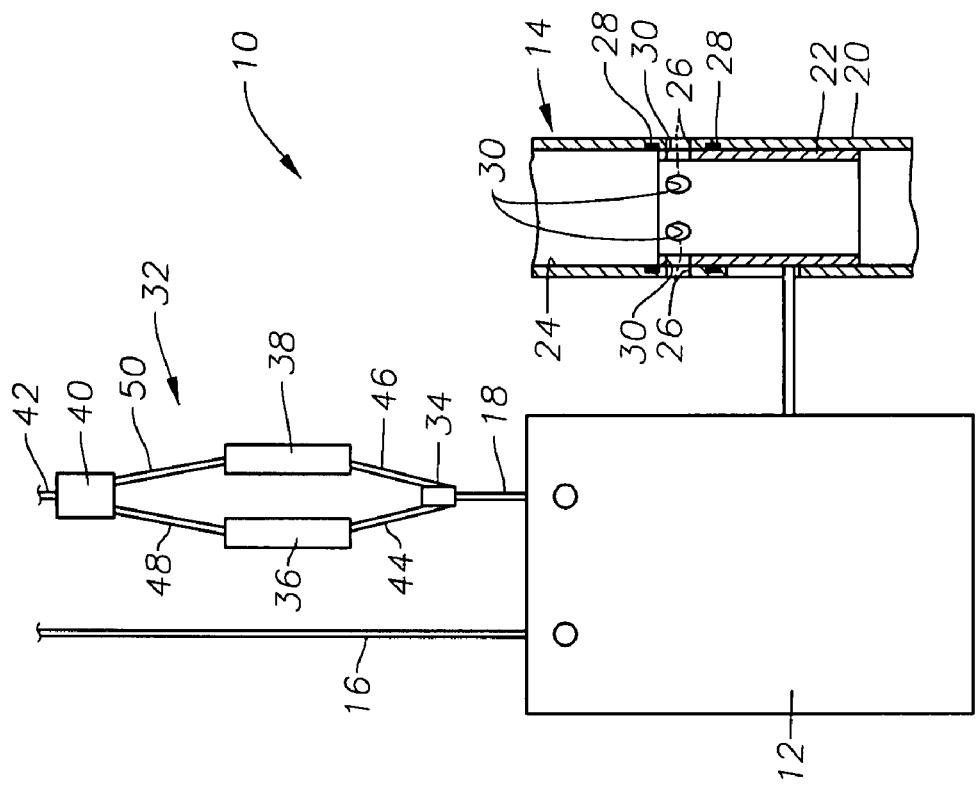
FIG. 3 is a schematic view of the arrangement shown in FIGS. 1 and 2, now with the sliding sleeve valve in a partially open position.
Figure 4:
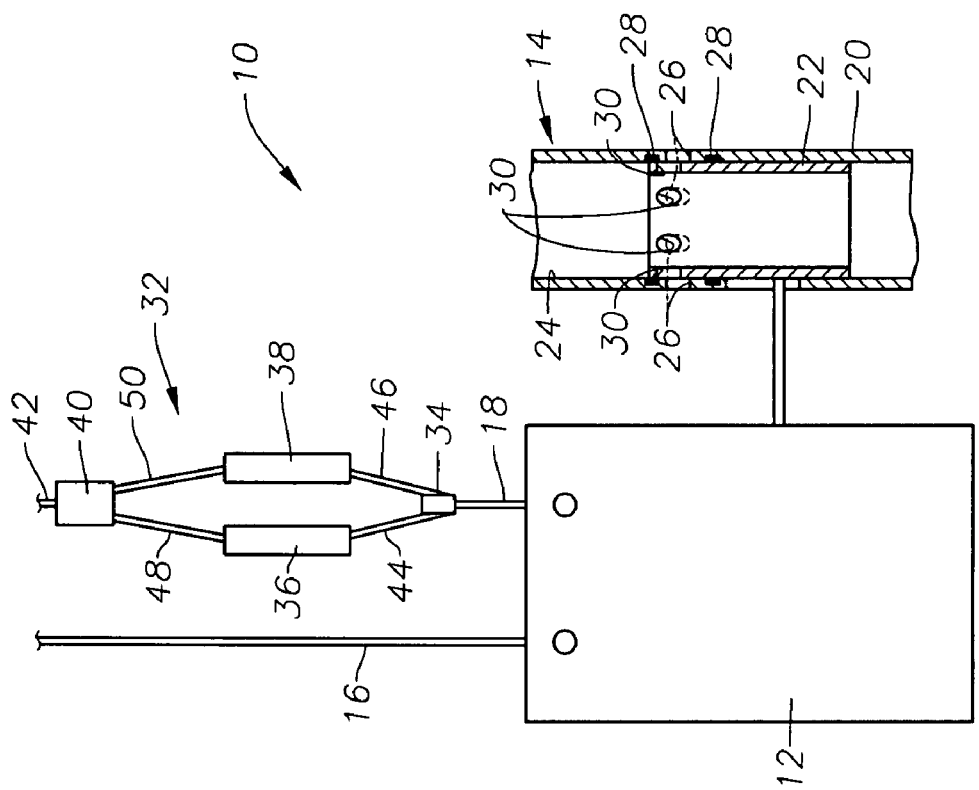
FIG. 4 is a schematic view of the arrangement shown in FIGS. 1-3, now with the sliding sleeve valve in a fully open position.

Returning to FIGS. 1-4, the general operation of the overall tool system 10 using the metering device 32 will now be described. The tool system 10 is run into a wellbore (not shown) with the sliding sleeve valve 14 in the closed position depicted in FIG. 1. During run in, the metering device 32 is in the initial, unpressurized condition depicted in FIGS. 5A-5B. When it is desired to move the sleeve valve 14 to a partially open position, fluid pressure is decreased in the hydraulic control line 42 relative to the pressure present in the hydraulic line 18. This pressure differential will cause the zero position free piston 64 to move from its initial position in contact with the lower end cap 56 to the pressurized position shown in FIG. 6A. In the pressurized position, the free piston 64 is in contact with or proximate to the upper end cap 54. This movement of the free piston 64 will cause the actuator 12 to move the sleeve 22 axially downwardly within its housing 20 so that the ports 30 of the sleeve 22 are moved to a point (as shown in FIG. 2) wherein they are close to overlapping the ports 26 of the housing 20. This position is referred to as the "zero position." In a currently preferred embodiment, the movement of the free piston 64 will cause the sleeve 22 to displace 10.604″ with respect to the housing 20.

The first and second piston metering assemblies 36, 38 are interconnected in hydraulic parallel. Therefore, the pressure differential across the metering device 32 will also cause the incremental piston pump 90 to move from the initial position shown in FIG. 5B to the pressurized position depicted in FIG. 6B, thereby displacing an additional volume of fluid from the actuator 12. The sleeve 22 will then be displaced an additional amount with respect to the housing 20 such that the ports 30 of the sleeve 22 now slightly overlap the ports 26 of the housing 20 and permit a small amount of fluid to pass through the sleeve valve 14. Thus, the sleeve valve 14 will be partially open. It is noted that when the incremental piston pump 90 is in the pressurized position, the enlarged pressure-receiving end 96 of the piston member 94 will engage a restriction 106 in the shaft 108 passing through the body of the sleeve 92, thereby limiting the movement of the piston member 94 with respect to the surrounding sleeve 92. When the piston member 94 has been displaced in this manner, the spring 104 is compressed, as shown in FIG. 6B.

If it is desired to open the sleeve valve 14 further to allow greater fluid flow, this is accomplished by first reducing the fluid pressure differential across the metering device 32 and then increasing it. As the pressure differential is reduced, the spring 104 of the incremental piston assembly 38 will urge the piston member 94 back to its initial, unpressurized position, as depicted in FIG. 5A. Because there is no elastomeric seal or other fluid tight sealing between the enlarged end 96 of the piston member 94 and the surrounding sleeve 92, fluid can seep between the piston member 94 and the sleeve 92 and equalize the pressure, thereby allowing the spring 104 to return the piston member 94 to its original position. The free piston 64 of the zero position piston metering assembly 36 will remain in its pressurized position, as shown in FIGS. 6A-6B.

Figure 6A:
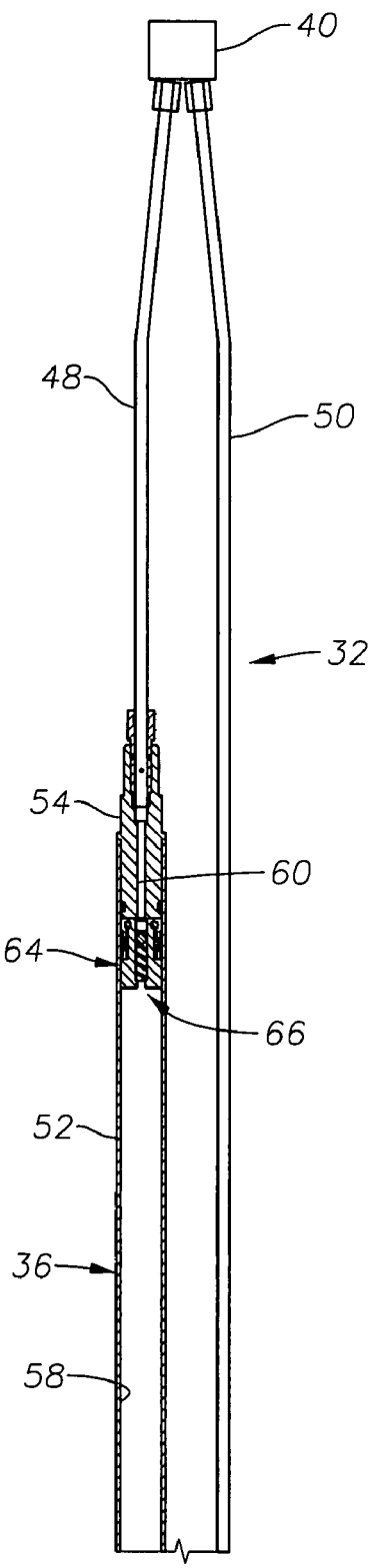
FIGS. 6A-6B present a side, cross-sectional view of the device depicted in FIGS. 5A-5B, now in a pressurized position.
Figure 6B:
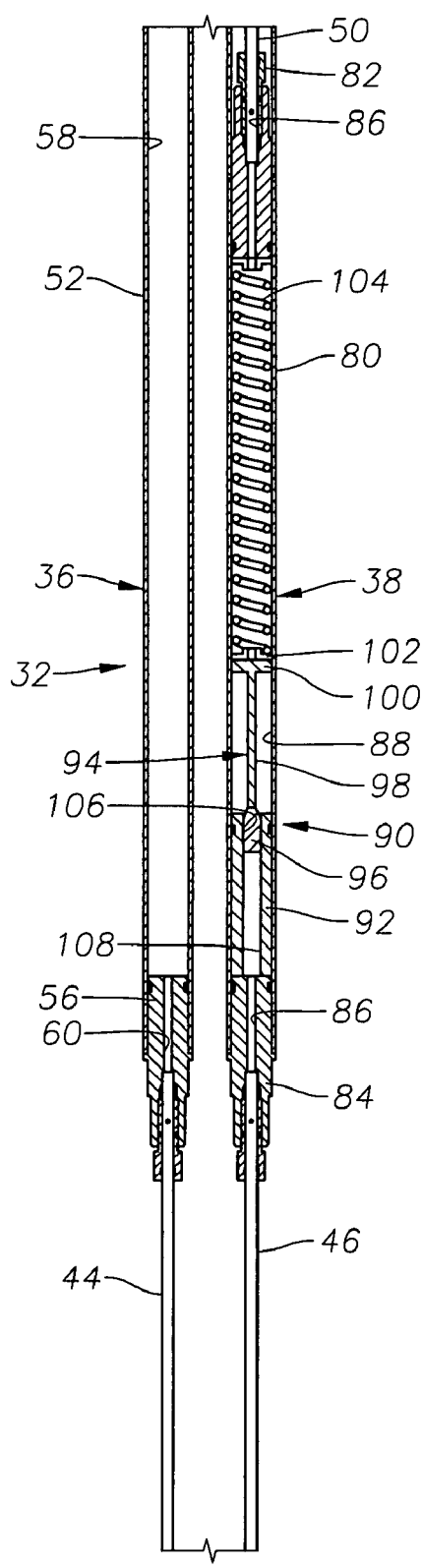
Figure 7:
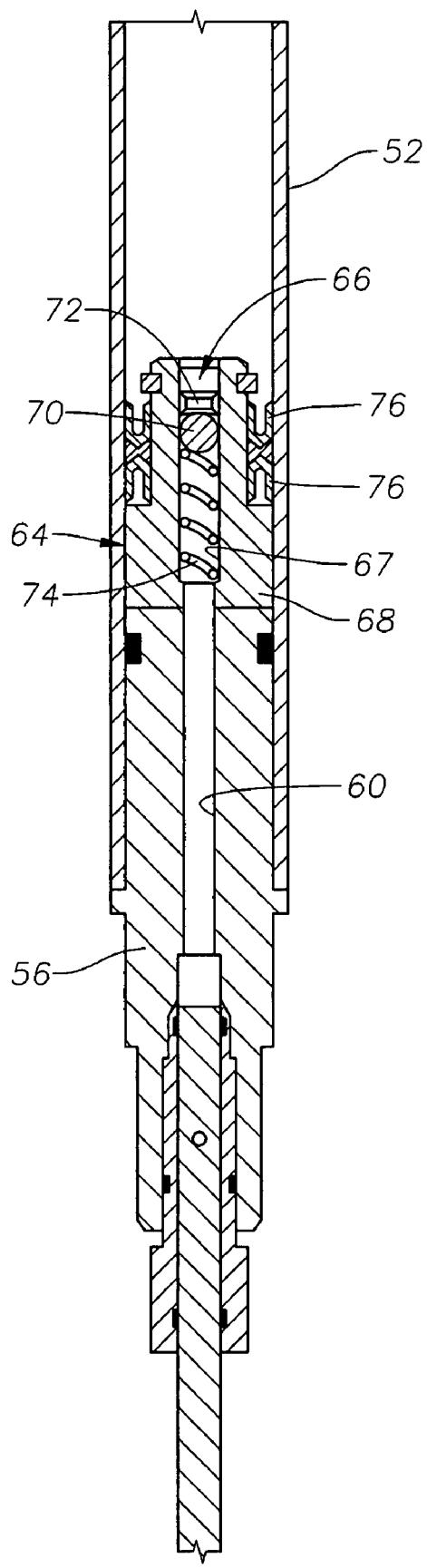
FIG. 7 is an enlarged cross-sectional view of a free piston used within the device shown in FIGS. 5A-5B and 6A-6B and surrounding components.

At this point, the pressure differential across the metering device 32 is increased to cause the incremental piston pump 90 to be actuated again so that the piston member 94 is moved to the extended position shown in FIG. 6A. This actuation meters an additional amount of fluid from the actuator 12 moves the sleeve 22 of the sleeve valve 14 an additional incremental amount toward the fully open position shown in FIG. 4. Those of skill in the art will recognize that the pressure differential across the metering device 32 may be repeatedly increased and decreased in order to move the sleeve 22 in a stepped manner to the fully opened position shown in FIG. 4.

To return the sliding sleeve valve 14 to its fully closed position, hydraulic fluid is pumped into the fluid conduit 42 to create a reverse pressure differential across the metering device 32. The zero position free piston 64 will be moved by the increased fluid pressure to the position shown in FIG. 5A. Hydraulic fluid entering the zero position piston metering assembly 36 will also urge the valve ball member 70 of the check valve 66 off the valve seat 72 and allow fluid to pass through the free piston and enter the fluid passage 60 of the end sub 56 and to the actuator 12. This fluid will cause the actuator to return the sleeve valve 14 to the fully closed position depicted in FIG. 1. The sliding sleeve valve 14 may be moved to the fully closed position in this manner at any time and regardless of the configuration that the sleeve valve 14 is in (i.e., zero position, partially open, fully open).

In the embodiment described, the metering device 32 is operably associated with the fluid outlet, or "close" line 18 of the actuator 12. However, it would also be possible to operate the well tool actuator by installing the metering device at the fluid inlet, or "open" line 16 of the actuator 12, thereby metering fluid into the actuator 12 from the metering device 32. It should be understood that, whether interconnected on the inlet or outlet side of the actuator 12, the metering device 32 operates the well tool 14 in a stepped manner by metering known amounts of fluid through the metering device 32.

A metering device constructed in accordance with the present invention is simple in construction and reliable in operation. Additionally, there are few elastomeric elements, such as O-ring seals needed for operation of the metering device, thereby making the device more resistant to wear-related problems or problems associated with high-temperature downhole environments.

Those of skill in the art will recognize that numerous modifications and changes may be made to the exemplary designs and embodiments described herein and that the invention is limited only by the claims that follow and any equivalents thereof.

What is claimed is:

1. A metering device for use in operating an operably associated well tool in a stepped manner by metering amounts of fluid through a control line, the metering device comprising:
   a) a first piston metering assembly for metering a first volume of fluid through the control line, the first piston metering assembly comprising:
      a piston housing having a fluid inlet and a fluid outlet and a piston chamber defined within the housing;
      a free piston moveably disposed within the piston chamber;
   b) a second piston metering assembly for metering a second volume of fluid through the control line, the second piston metering assembly comprising:
      a piston housing having a fluid inlet and a fluid outlet and an incremental piston chamber defined within the housing; and
      an incremental piston for sequentially displacing the second volume of fluid through the incremental piston chamber.

2. The metering device of claim 1 wherein the incremental piston comprises:
   a sleeve disposed within the incremental piston chamber, the sleeve having a fluid pathway disposed axially therethrough;
   a piston member moveably disposed within the fluid pathway of the sleeve, the piston member having a pressure-receiving end portion for receiving fluid pressure from the fluid inlet, the piston member further being moveable between a retracted position and an extended position wherein said second volume of fluid is displaced, and a spring for biasing the piston member toward the retracted position.

3. The metering device of claim 1 wherein the free piston contains a fluid pathway to allow fluid to flow through the free piston, and further comprises a check valve within the fluid pathway to permit one-way flow of fluid through the fluid pathway.

4. The metering device of claim 1 wherein the first and second piston metering assemblies are interconnected in hydraulic parallel.

5. A well tool system comprising:
a) a well tool that is operable by shifting a component within the well tool among a finite number of increments between two extreme configurations;
b) a hydraulic metering device operably interconnected to the well tool by a control line to shift the component incrementally as amounts of fluid are metered through the control line, the metering device comprising:
a first piston metering assembly for displacing a first volume of fluid through the control line; and
a second piston metering assembly in parallel with the first piston metering assembly for displacing a second volume of fluid through the control line.

6. The well tool system of claim 5 wherein the well tool comprises a sliding sleeve valve and the component comprises a sleeve within the sliding sleeve valve, and the two extreme configurations comprise open and closed configurations.

7. The well tool system of claim 5 further comprising an actuator for the well tool and wherein the hydraulic metering device is operably interconnected with the well tool by metering fluid out of the actuator to move the well tool component.

8. The well tool system of claim 5 wherein the first piston metering assembly comprises:
a piston housing having a fluid inlet and a fluid outlet and a piston chamber defined within the housing; and
a free piston moveably disposed within the piston chamber.

9. The well tool system of claim 5 wherein the second piston metering assembly comprises:
a piston housing having a fluid inlet and a fluid outlet and an incremental piston chamber defined within the housing; and
an incremental piston for sequentially displacing the second volume of fluid through the incremental piston chamber.

10. A method of operating a downhole well tool having a component that is axially shiftable among a finite number of increments between closed and open configurations, the method comprising the steps of:
a) associating a hydraulic metering device with a control line for the well tool such that the component of the well tool is shifted as fluid is metered through the control line;
b) disposing the well tool and metering device within a wellbore with the well tool in the closed configuration;
c) actuating the metering device to move the component of the well tool from the closed configuration to an intermediate, partially open configuration by;
actuating a first piston metering assembly of the metering device to displace a first volume of fluid through the control line to move the component such that the well tool is in a zero position; and
actuating a second piston metering assembly of the metering device to displace a second volume of fluid through the control line to move the component such that the well tool is in a partially open position.

11. The method of claim 10 further comprising the step of further actuating the metering device to move the well tool to a fully open position.

12. The method of claim 10 wherein the step of displacing a first volume of fluid through the control line comprises hydraulically moving a free piston within a piston chamber of the first piston metering assembly.

13. The method of claim 10 wherein the step of displacing a second volume of fluid through the control line comprises hydraulically moving a piston within a piston chamber of the second piston metering assembly.

14. The method of claim 10 wherein the hydraulic metering device is associated with a fluid outlet of an actuator for the well tool, and the well tool is moved toward an open configuration as fluid is metered out of the actuator.

15. The method of claim 10 further comprising the step of moving the well tool to a fully closed position.

16. The method of claim 15 wherein the step of moving the well tool to a fully closed position comprises:
flowing fluid into the first piston metering assembly;
opening a check valve within a free piston within the first piston metering assembly to flow fluid through the free piston and into an actuator for the well tool, thereby closing the well tool.

* * * * *